United States Patent [19]
VerWeyst et al.

[11] Patent Number: 5,829,583
[45] Date of Patent: Nov. 3, 1998

[54] CONTAINER FOR PACKAGING RECORDED MEDIA

[75] Inventors: Gordon E. VerWeyst, Rockford; Walter P. Pietruch, Belvidere, both of Ill.

[73] Assignee: J.L. Clark, Inc., Rockford, Ill.

[21] Appl. No.: 838,518

[22] Filed: Apr. 8, 1997

Related U.S. Application Data

[60] Provisional application No. 60/014,988 Apr. 8, 1996.
[51] Int. Cl.$^6$ .................................................. B65D 85/30
[52] U.S. Cl. ...................................... 206/308.1; 206/307.1
[58] Field of Search ............................. 206/307.1, 308.1, 206/308.3, 309, 312, 493

[56] References Cited

U.S. PATENT DOCUMENTS

| | | | |
|---|---|---|---|
| 4,869,364 | 9/1989 | Bray | 206/308.3 |
| 4,993,552 | 2/1991 | Bugbey et al. | 206/307.1 |
| 5,176,250 | 1/1993 | Cheng | 206/308.1 |
| 5,462,158 | 10/1995 | Kramer | 206/308.1 |
| 5,638,952 | 6/1997 | Kim | 206/307.1 |
| 5,653,335 | 8/1997 | Bauer et al. | 206/307.1 |
| 5,695,054 | 12/1997 | Weisburn et al. | 206/308.1 |

*Primary Examiner*—Paul T. Sewell
*Assistant Examiner*—Nhan T. Lam
*Attorney, Agent, or Firm*—Leydig, Voit & Mayer, Ltd.

[57] ABSTRACT

A low profile container for packaging a compact disc (CD) and a 3.5" floppy disc. The container has separable container top and bottom. The container bottom has a dish with a depth greater than the combined thickness of the CD and the floppy disc and two separate levels for receiving respectively the CD and the floppy disc. In one embodiment, the dish has a circular depression for receiving the optical disc, and four notches on the wall of the circular depression for receiving the four corners of the floppy disc.

5 Claims, 4 Drawing Sheets

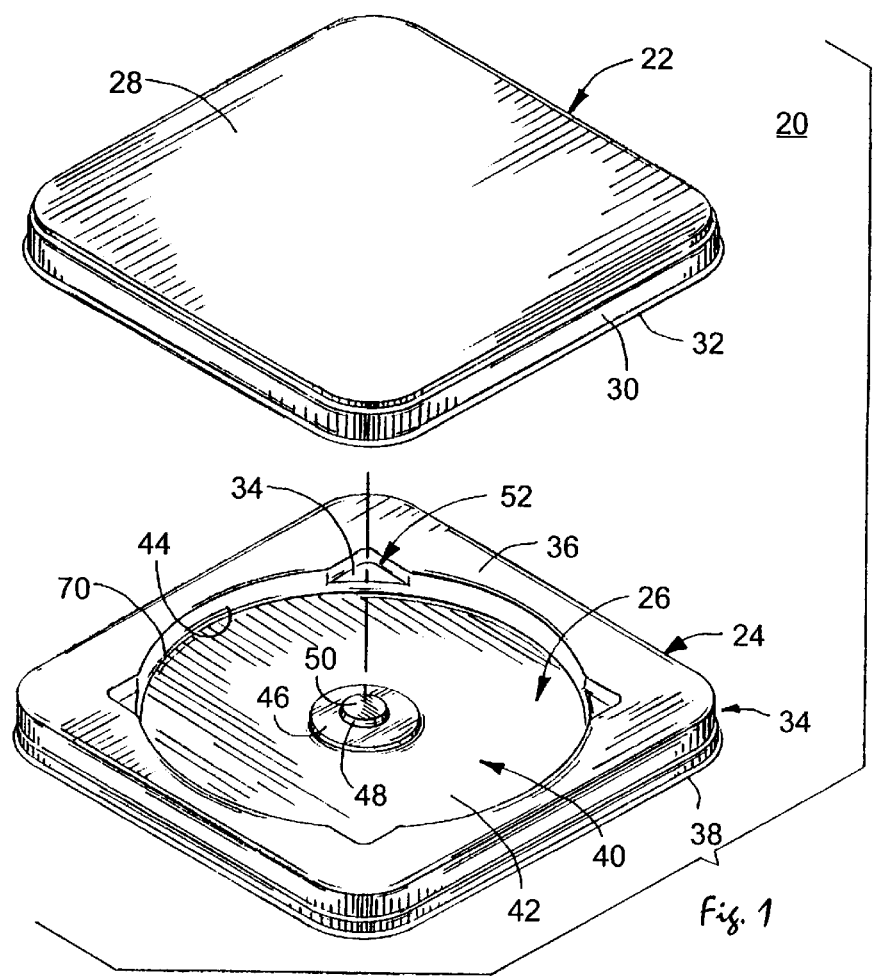
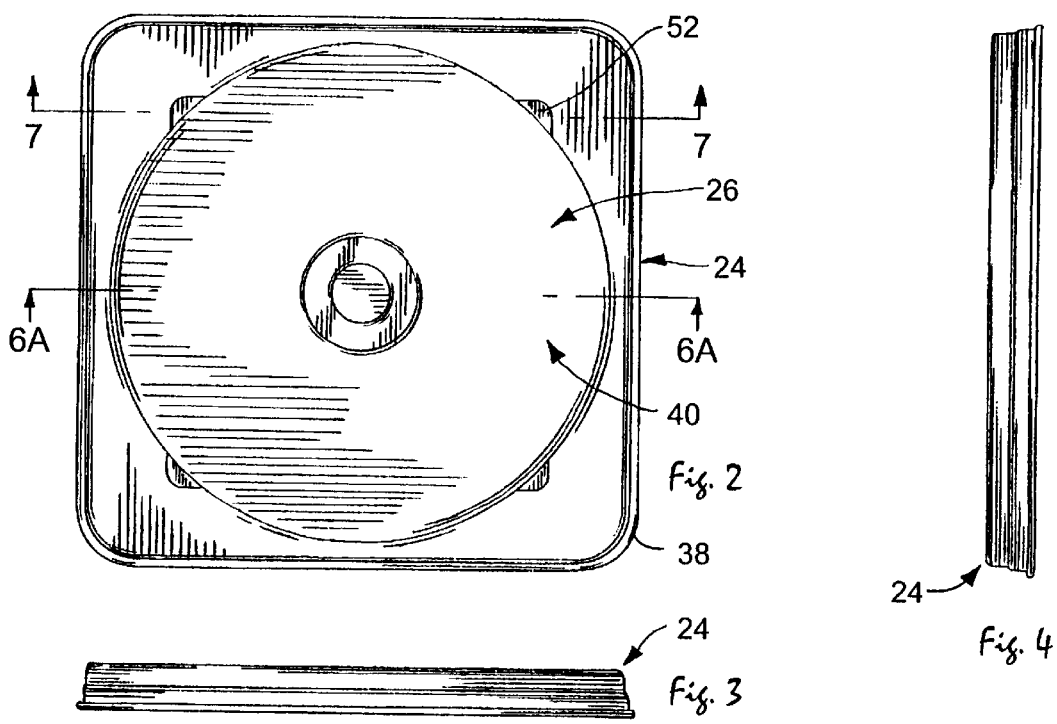

CONTAINER FOR PACKAGING RECORDED MEDIA

RELATED APPLICATIONS

This application claims the benefit U.S. provisional application Ser. No. 60/014,988, filed Apr. 8, 1996.

FIELD OF THE INVENTION

This invention relates generally to containers, and more particularly to containers for packaging recorded media such as compact discs or floppy discs.

BACKGROUND OF THE INVENTION

Currently the distribution of digitally recorded material such as computer software still relies heavily on the physical transfer of recorded media such as floppy discs, compact discs (CDs), etc. Although the formats of recorded media have been well standardized, subject to the development of new recording technology, it is often difficult to find suitable containers for packaging recorded media that meet specific packaging needs.

For example, such difficulties are currently experienced by companies that distribute software via the mailing system. In order to arouse consumers' interests in their products or services, it has become a common promotional practice for software companies or information service providers to distribute free "DEMO" version software or software for accessing their information services. Such distribution of software is often accomplished by means of mass mailing recorded media containing such software. For a long time the commonly used recording media for such distribution have been floppy disks, typically the 3.5" type. However, as CD-ROMs drivers are now a standard feature on almost all new personal computers, it is increasingly common to distribute software in the format of CD-ROMs. In the past, the floppy discs or even compact discs are typically mailed in cardboard boxes or envelopes. The cardboard packaging, however, can be bent or crushed easily and therefore does not provide satisfactory protection to the contents therein, and high damage rates have been reported.

It has been proposed to use metal containers to package recorded media because metal containers are generally much stronger than cardboard boxes or the like. Indeed, currently there are commercially available two types of metal containers for packaging music CDs. The first type of metal container is basically a conventional low-profile box having drawn top and bottom. The container has a rectangular shape and has the general dimensions of the conventional plastic "jewel box" containers for packaging CDs. The container bottom has a rectangular inner surface which is flat except for an embossed standoff and an embossed short post concentric with the standoff disposed at the center of the bottom. A CD packaged in the container is held in position by the embossed post which provides a sliding fit with the center hole of the CD. Although such a container provides good protection against damages by external forces, it is not satisfactory because a CD stored therein can be damaged "internally". This is because the sliding fit provided by the embossed post is insufficient for holding firmly a CD mounted thereon. If the CD comes off the post, it can move around in the container, causing the recorded surface of the CD to be scratched by the embossed post.

The second type of metal container used in the past for packaging a CD has a round shape, with a container bottom that is stamped to produce a shallow circular dish surrounded by an embossed rim. An embossed post in the center of the dish provides a sliding fit with the center hole of a CD. The depth of the dish is approximately the same as the thickness of the CD, and the diameter of the dish is only slightly larger than that of the CD, so that the room for the CD to move about in the closed container is quite restricted.

The problem of finding suitable containers for packaging recorded media is complicated by the need to combine recorded media of different formats in the same package for a variety of reasons. For example, although CD-ROM drivers are becoming common, many older computers are not equipped with CD-ROM drivers. In order to ensure that a target customer can use the software, it is often desirable to send to the target customer the promotional software recorded on both a CD-ROM and a 3.5" disc. As another example, some companies offering specialty data bases distribute promotional material that includes a CD-ROM containing a portion of a data base, and a floppy disc containing a search program with restricted life time for reading the data on the CD-ROM. Although it is possible to package a CD and a floppy disc in separate containers and ship them together, it would be much more economical and convenient to put both of them in the same container for shipping and handling. Moreover, the economies of scale suggests that it would be advantageous to use a single type of "universal" container regardless of whether either or both recorded media will be enclosed. The cardboard packaging commonly used in the past has been shown to be unsatisfactory in terms of providing adequate protection to the contents therein. The existing types of metal containers are also unsuitable for packaging both a CD and a floppy disc. Thus there is currently a need for a suitable shipping container that can accommodate both a CD and a 3.5" disc, or only one of them, depending on the needs of the user.

SUMMARY OF THE INVENTION

In view of the foregoing, it is a primary object of the present invention to provide a container that is universal in that it can be used to package either a CD or a floppy disc, or both of them at the same time, for effective protection thereof during handling and shipping.

It is a related object of the present invention to provide such a container that is configured to minimize the risk of scratching the recorded surface of a CD stored therein.

It is another related object of the present invention to provide such a container that has a relatively low profile and relatively small size to facilitate shipping and handling.

It is a more specific object of the present invention to provide a container formed partially or entirely of metal for enhanced protection of the contents therein that can be used to package either or both of a CD and a floppy disc.

It is a related object of the present invention to provide such a container that has a relatively simple structure and is inexpensive to manufacture.

In accordance with these and other objects of the present invention, there is provided a low profile container having a container top and a container bottom with a two-level dish which is capable of receiving either a CD or a floppy disc, or both at the same time. The two-level dish has a depth greater than the combined thickness of the CD and the floppy disc and is formed to have first and second levels for receiving, respectively, the CD and the floppy disc. The first level provides support surfaces for supporting the CD when received therein. Likewise, the second level provides support surfaces for supporting the floppy disc when received therein. The two-level dish thus provides independent support for each of the CD and the floppy so that one of them can be stacked over the other. Alternatively, the container can be used to package either of the CD and the floppy disc individually. The container is thus "universal."

The shape of the two-level dish depends on the order in which the CD and floppy disk are stacked in the dish. In a first configuration, the floppy disc is stacked over the CD. The dish has a generally cylindrical depression with a circular floor for receiving a CD. A post at the center of the floor is sized to fit the center hole of a CD. Four right-angle notches are formed on the wall of the cylindrical depression for receiving the four corners of a floppy disc. The notches are disposed in a plane spaced from the floor by a distance greater than the thickness of a CD to provide sufficient space for receiving the CD.

In a second configuration, the CD is stacked over the floppy disc. In this configuration, the dish has a square depression at the bottom of a depth sufficient for receiving the floppy disc, and four shelves surrounding the square depression. The shelves are segments of a circle which is sized to receive the CD.

Other objects and advantages will become apparent from the following detailed description when taken in conjunction with the drawings, in which:

BRIEF DESCRIPTION OF THE DRAWINGS

FIG. 1 is an exploded perspective view of an embodiment of a container having a container top and a container bottom constructed according to the present invention;

FIG. 2 is a top view of the container bottom in FIG. 1;

FIG. 3 is a front elevation of the container bottom in FIG. 1;

FIG. 4 is a side elevation of the container bottom in FIG. 1;

FIG. 11A is a cross sectional view of the container bottom in FIG. 10; and

DETAILED DESCRIPTION OF THE PREFERRED EMBODIMENTS

Figure 5:
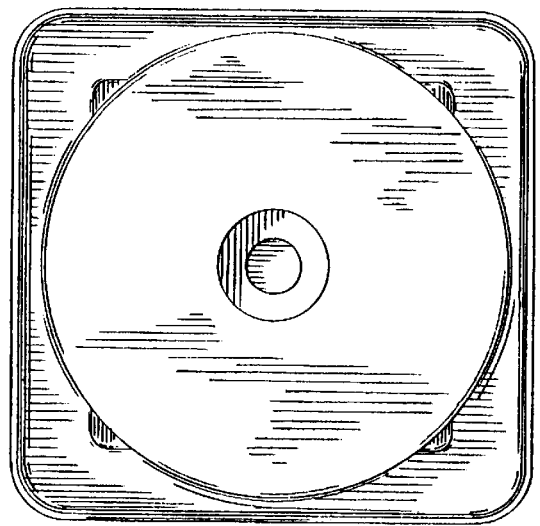
FIG. 5 is a bottom view of the container bottom in FIG. 1.

While the invention will be described in connection with certain preferred embodiments, there is no intent to limit it to those embodiment. On the contrary, the intent is to cover all alternatives, modifications, and equivalents included within the spirit and scope of the invention as defined by the appended claims.

Turning now to the drawings, FIG. 1 shows an embodiment of a container 20 of the present invention. The container 20 has a low profile, with separable container top 22 and bottom 24. Preferably both the container top 22 and bottom 24 are made of formed sheet metal for enhanced strength and durability of the container. As an alternative, the container bottom may be made of plastic and used in combination with a metal container top to provide the required strength and durability.

Generally, the container bottom 24 has a two-level dish 26 for receiving both a CD and a floppy disc, or only one of them. The two-level dish 26 has a depth greater than the combined thickness of the CD and the floppy disc and is shaped to have first and second levels for receiving, respectively, the CD and the floppy disc. The first level has a height slightly greater than the thickness of the CD, and has support surfaces for supporting the CD when received therein. Likewise, the second level has a height sufficient for receiving the floppy disc, and has support surfaces for supporting the floppy disc when received therein. Because the two-level dish 26 provides independent support for each of the CD and the floppy disc, the CD and the floppy disc can be packaged therein together or individually.

More specifically, the container bottom 24 in the embodiment in FIG. 1 is configured such that the lower level of the dish 26 is for receiving a CD, and the upper level for receiving a floppy disc. In this embodiment, both the container top 22 and the container bottom 24 are formed of metal sheet. The container top 22 has a relatively simple shape, with a closed end 28 and an upstanding wall 30 formed by drawing. The edge 32 of the upstanding wall 30 is formed to eliminate exposed raw edges. The metal container bottom 24 includes an upstanding peripheral wall 34, a raised rim portion 36, and a two-level dish 26 surrounded by the rim portion. The peripheral wall 34 is formed by drawing, and the body of the container bottom 24 is then redrawn to form the rim portion 36 and the dish 26. The edge 38 of the peripheral wall 34 is also preferably formed to remove any exposed raw edges. The size and shape of the peripheral wall 34 matches that of the opening defined by the formed edge 32 of the container top 22 so that the top can be slid over the peripheral wall of the bottom to form a closed container.

For receiving a CD, the lower level of the dish 26 is formed to have a cylindrical depression 40 including a circular floor 42 and a side wall 44 surrounding the circular floor. At the center of the floor 42 is an embossed standoff 46 of a circular shape, and an embossed center post 48 on the standoff and generally concentric with the standoff. The embossed post 48 has a diameter close to that of the center hole of a CD so that it provides a sliding fit with the center hole when the CD is mounted thereon. The surface of the standoff 46 supports the CD and elevates the recorded surface of the CD from the floor 42 so that the surface will not be in direct contact with the floor. As will be described in further detail below, the post 50 also serves as a standoff for supporting the central portion of a floppy disc placed in the dish 26. To that end, the post 48 has a height that is slight greater than the thickness of the CD so as to provide sufficient space between the floppy disc and the standoff for receiving the CD.

The upper level of the dish 26 includes four depressed notches 52 on the side wall 44 of the cylindrical depression 40 which defines the lower level. The notches 52 are evenly distributed around the cylindrical depression, i.e. they are disposed ninety degrees apart from each other. Each notch 52 has a general shape of a right triangle for receiving a corner of a floppy disc when the floppy is inserted in the dish. Each notch 52 has a floor surface 54, and the floor surfaces are preferably disposed in the same plane. In the present embodiment, the floor surfaces 54 and the top surface 50 of the post 48 are all disposed in the same plane. Thus, when a floppy disc is positioned in the dish 26, each corner of the disc is supported by the floor 54 of a corresponding notch, and the hub of the disc rests on the top surface 50 of the post 48.

FIG. 2 provides a top view of the container bottom 24. The container bottom 24 of the present embodiment has a generally square peripheral shape, with the continuous raised rim 36 surrounding the dish 26. The vertical projection of the two-level dish 26 is generally circular, but with four notches 52 separated ninety degrees apart. The cylindrical depression 40 defines a circular contour slightly larger than that of a CD, and the four notches 52 define a square slightly larger than a standard 3.5" floppy disc. As can be seen in FIG. 2, the combined contour of the cylindrical depression 40 and the notches 52 is close to what would be obtained by superimposing a square on a circle, the former corresponding to the shape of a 3.5" floppy disc, the latter corresponding to the shape of a CD. The front elevation, side elevation, and bottom view of the container bottom 24 are shown, respectively, in FIGS. 3, 4, and 5.

Figure 6A:
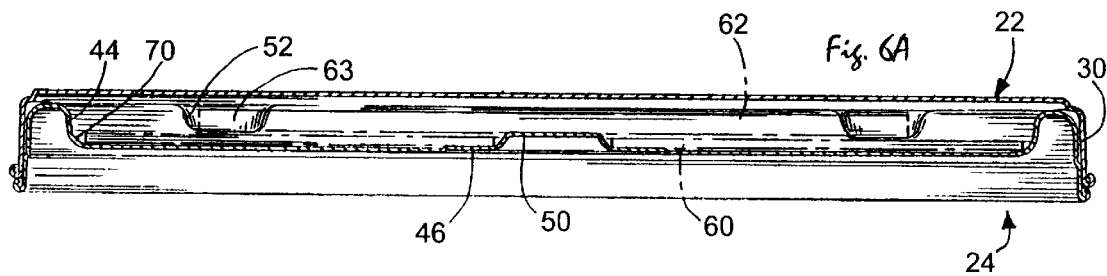
FIG. 6A is a cross sectional view of the container bottom along the line 6A—6A in FIG. 2, together with the container top in a closed position, and a CD and a floppy disc disposed therein.
Figure 6B:
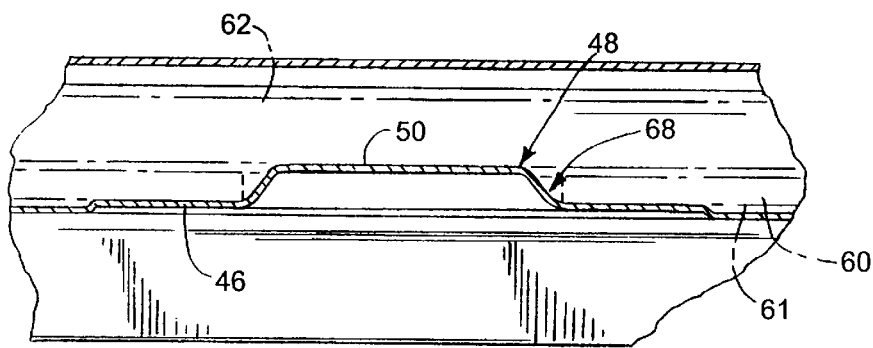
FIG. 6B is an enlarged fragmentary cross sectional view of the central portion of the closed container.

FIG. 6A shows the cross sectional view of the container bottom 24 along the line 6A—6A in FIG. 2, which extends across the center post 48. Also shown in FIG. 6A is the container top 22 in a position where it forms a closed container with the bottom, and a CD 60 and a floppy disc 62, both shown in dashed lines, disposed in the container. As can be best seen in FIG. 6B, the CD 60 is mounted on the post 48. The post 48 provides a sliding fit with the center hole 68 of the CD 60, thereby centering the CD in the dish 26. Turning back to FIG. 6A, the four corners 63 of the 3.5" floppy disc are supported by the four notches 52, and the hub of the floppy disc 62 rests on the top surface 50 of the post 48. The distance between the circular floor 42 and the plane containing the top surface 50 of the post and the floors 54 of the notches is slightly larger than the thickness of the CD 60, so that a small clearance is provided between the CD and the floppy disc when they are placed in their respective positions. The floppy disc 62 further serves the function of confining the CD 60 in its vertical position. The vertical movement of the floppy disc 62 itself is confined by the container top 22, which in the closed position is spaced from the floppy disc by a small clearance. Because the efficient use of space in stacking the CD and the floppy disc, the entire container has a very low profile, preferably around 0.5" or less.

Figure 6C:
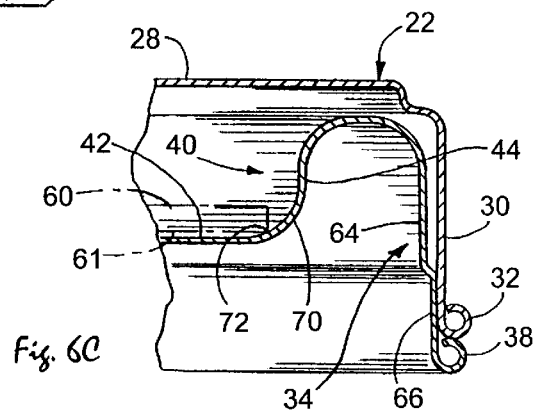
FIG. 6C is an enlarged fragmentary cross sectional view of the peripheral portion of the closed container.
Figure 7:
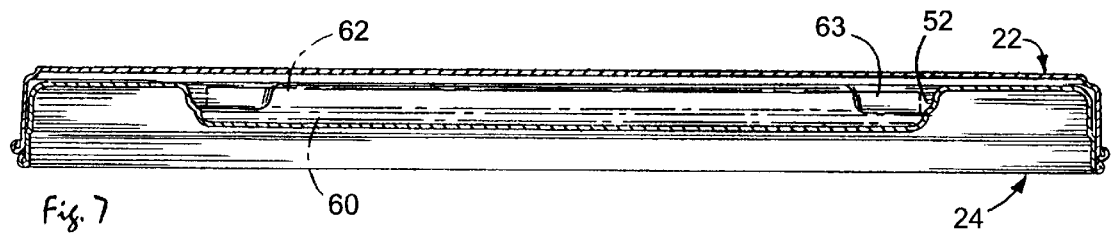
FIG. 7 is a cross sectional view of the closed container along the line 7–7 in FIG. 2.

As can be best seen in FIG. 6C, the base portion 70 of the sidewall 44 surrounding the cylindrical floor is radiused. In other words, the cylindrical depression 40 has a radiused corner. The radius of the radiused base portion 70 is determined by the corner radius of the punch used to form the cylindrical depression. Because the cylindrical depression is fairly shallow, the punch corner radius is chosen to be sufficiently small such the wall 44 is as vertical as possible but large enough to prevent tearing or fracturing of the metal sheet in the drawing process. The distance between the wall 44 and the center post 48 is such that the peripheral edge 72 of the CD 60 mounted on the post would engage the radiused base 70. Thus, the radiused base portion 70 of the wall provides support to the edge 72 of the CD, while the standoff 46 supports the central portion of the CD. The standoff 46 and the radiused base 70 of the wall together provide a small clearance between the recorded surface 61 of the CD and the floor 42 to prevent direct contact of the recorded surface with the floor. Another important function of the side wall 44 is to limit the lateral movements of the CD. Thus, even if a CD mounted in the dish 26 is disengaged from the post 48, the lateral freedom of movement of the CD 60 is limited so that the post will not reach the recorded surface 61 of the CD to cause scratches thereon.

When the container is closed, the upstanding wall 30 of the top 22 engages the peripheral wall 34 of the bottom 24. The upstanding wall 30 of the top is sized to form a frictional fit with the peripheral wall 34 of the bottom. To facilitate the opening of the closed container, the peripheral wall 34 is stepped such that an upper portion 64 is offset slightly inwardly from the lower portion 66. Thus, when the container top is installed, the upstanding wall 30 of the top engages only the lower portion 66 of the peripheral wall 34. In this way, the height of the contact region between the peripheral wall 34 and the upstanding wall 30 is controlled to be sufficiently large to reliably retain the top 22 on the bottom 24 but not too large to make opening the container difficult. The formed edge 38 of the container bottom serves as a stop for the formed edge 32 of the container top.

The cross sectional view of the container bottom 24 along the line 7—7 in FIG. 2, which extends through two adjacent notches 52, is shown in FIG. 4. The separation between the notches 52 is slightly greater than the width of the floppy disc 62 to allow easy insertion of the floppy disc without providing excessive lateral slack.

It will be appreciated that the use of the container is not limited to packaging both a CD and a floppy disc at the same time. Instead, the user has the flexibility to select whether to put a CD, a floppy disc, or both, in the container. As illustrated in FIG. 6A, the container bottom 24 provides independent support for the CD and the floppy disc, except that the floppy disc is also used to confine the upward movements of the CD. Thus, the container is readily usable for packaging a floppy individually. When the container is used to package a CD only, the user can put a blank having the general dimensions of the floppy disc in the space where a floppy disc would be. The blank preferably is made of cardboard or styrofoam so that it can be very inexpensive. The use of a "universal" container for packaging the different combinations of a CD and a floppy disc reduces stocking costs and also provides the benefits of economies of scale in manufacturing.

Figure 8:
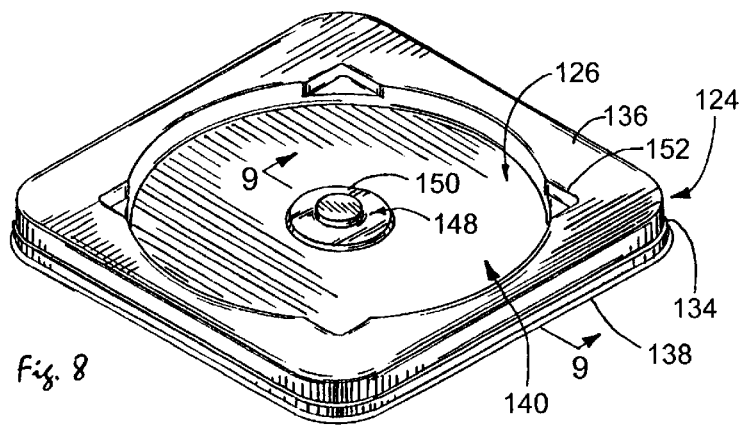
FIG. 8 is a perspective view of an alternative embodiment of a container bottom formed of molded plastic.

FIG. 8 shows a different embodiment of a container bottom 124. This embodiment has the general dimensions and features of the embodiment just described above, but is made of molded plastic instead of formed metal sheet. Thus, the container bottom 124 also has a peripheral wall 134, a raised rim 136 surrounding a dish 126 with a cylindrical depression 140 for receiving a CD, and four notches 152 for receiving a floppy disc. A post 148 at the center of the cylindrical depression 140 provides a sliding fit with the center hole of a CD.

Figure 9:
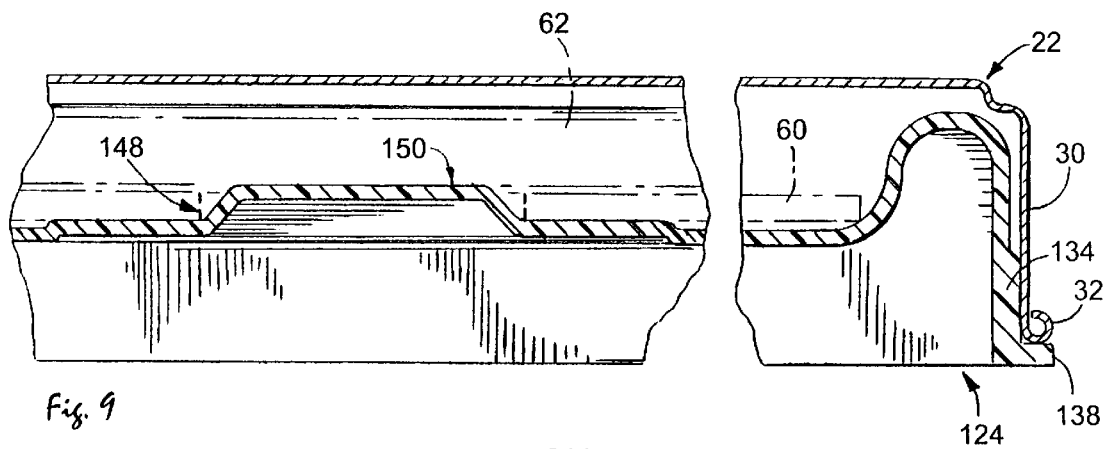
FIG. 9 is an enlarged fragmentary cross sectional view of the central and peripheral portions of the plastic container bottom in FIG. 8.

Because the plastic bottom 124 has the same outer dimensions of the metal bottom 24 in FIG. 1, the same metal top 22 may be used to form a closed container with the plastic bottom. The cross section of the plastic container bottom 124 is shown in FIG. 9 together with the metal top 22 in the closed position. Also shown are a CD 60 and a floppy disc 62 in dashed lines positioned in the dish 126. In the closed position, the inner surface of the upstanding wall 30 of the container top 22 engages the peripheral wall 134 of the bottom. A ledge 138 at the lower end of the peripheral wall 134 of the plastic bottom serves as a stop for the formed edge 32 of the metal top 22.

The plastic container bottom 124 preferably is formed of molded polypropylene or other suitable plastic material that has good impact tolerance and has sufficient rigidity for protecting the recorded media disposed therein. Because the container bottom 124 preferably is used in combination with a metal container top 22 which is reasonably strong, the plastic forming the bottom may be more flexible than the types of material usually found in all-plastic containers such as the conventional "jewel box" containers for packaging CDs.

In the embodiments described above, the container bottoms are configured for stacking a floppy disc over a CD. It will be appreciated that a container of the present invention can also be configured for stacking a CD above a floppy disc. In general, the shapes of the two-level dishes as shown in the illustrated embodiments may be considered as the combination of two depressions. The first depression has a generally square outline which is slightly larger than that of a standard 3.5" floppy disc. The second depression has a generally cylindrical outline slightly larger than that of a standard CD. The resultant shape of the dish depends on the relative depth of the two depressions, which depends on the order in which the CD and the floppy disc are to be stacked in the two-level dish. If the lower level of the dish is for receiving the CD, than the cylindrical depression would be deeper than the square depression by at least the thickness of the CD. Conversely, if the lower level is for receiving the floppy disc, then the square depression would be deeper than the cylindrical depression by at least the thickness of the floppy disc. Because the peripheral shape of the cylindrical impression is not commensurate with that of the square depression, each depression provides support surfaces which define a unique contour for receiving the respective recorded medium.

Figure 10:
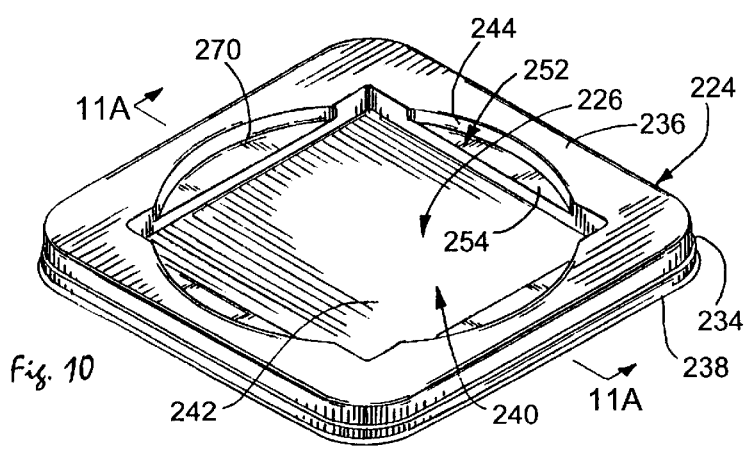
FIG. 10 is a perspective view of another alternative embodiment of a container bottom.

An example of a container bottom for stacking a CD over a floppy disc is shown in FIG. 10. The container bottom 224 in this illustrated embodiment is made of formed sheet metal. Its outer dimensions are identical to those of the container bottoms described above, so that the same container top 22 can be used with the container bottom 224 to form a closed container. In accordance with the teaching of the present invention, the container bottom 224 has a two-level dish 226, with each level providing support surfaces for receiving a CD or a floppy disc. The lower level of the dish 226 has a generally square depression 240 for receiving a floppy disc. The square depression 240 has a flat floor 242 and a depth slightly larger than the thickness of the floppy disc. Surrounding the square depression 242 are four shelves 252 each having the shape of a segment of a circle. The four shelves 252 share a generally circular contour close to that of a CD. The shelf surfaces 254 of the shelves are preferably formed in the same plane. Each shelf 252 is bordered by a wall 244 with a radiused base portion 270.

Figure 11B:
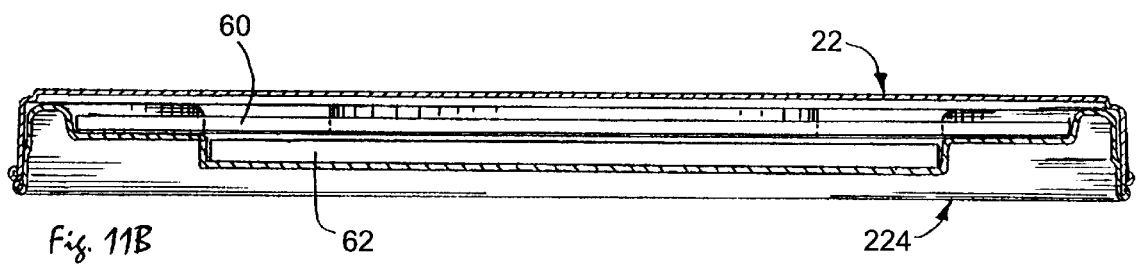
FIG. 11B is an enlarged fragmentary cross sectional view of the peripheral portion of the container bottom in FIG. 10.
Figure 11B:
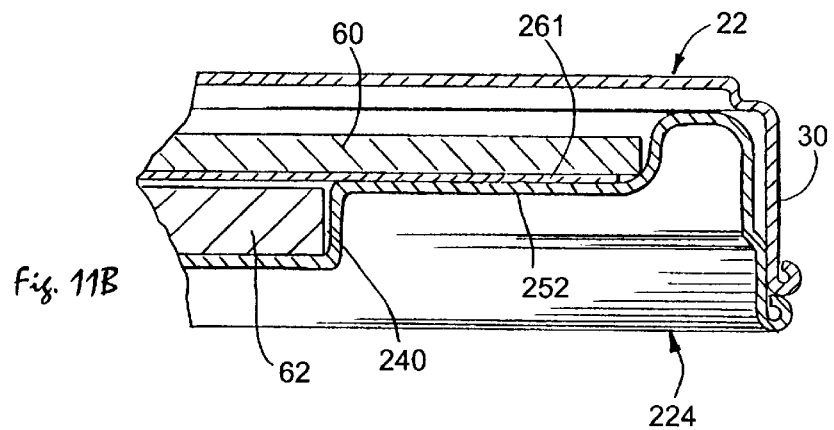

The cross sectional view of the container bottom 224 is shown in FIG. 11A. Also shown are the metal container top 22 in the closed position, a floppy disc 62 placed in the square depression 240, and a CD 60 supported by the radiused base 270 of the walls 244. An enlarged view of the peripheral porion is shown in FIG. 11B. When the CD 60 is placed in the dish 226, instead of resting directly on the shelf surfaces 254, the edge of the CD 60 engages the radiused base portion 270 of the walls 244, thereby providing a small clearance between the CD surface and the shelf surfaces 254 to prevent scratching of the CD surface. In this embodiment, the CD 60 serves the function of confining the upward movement of the floppy disc 62. In order to prevent the floppy disc 62 from scratching the surface of the CD 60, preferably a circular sheet 261 of non-abrasive material such as paper or cloth is positioned on the shelf surfaces 254 to separate the CD 60 from the floppy disc 62. Alternatively, the CD 60 may be positioned so that its recorded surface faces up, and a sheet of non-abrasive material may be placed over the CD to prevent the CD from contacting the container top 22.

Even though the embodiments described above are configured for the specific purpose of packaging a standard 4.5" CD with a standard 3.5" floppy disc, it will be appreciated that the present invention is not limited to containers for packaging recorded media of these two formats. Indeed, the present invention can be used to package other existing or future formats of recording media. For example, the sizes of the circular depression 40 and the notches 52 in the embodiment in FIG. 1 can be adjusted to accommodate respectively a circular disc and a rectangular recording medium that have dimensions different from the currently standard formats. As another example, the two-level dish 226 in the container bottom in FIG. 10 can be reconfigured to have a circular depression at the bottom for receiving a mini-disc, and an annular shelf surrounding the circular depression for receiving a regular CD. It will be understood that the two-level dish can be configured to provide independent support for two non-identical recording media out of a variety of different formats without deviating from the scope and spirit of the present invention.

It will now be appreciated that what has been provided is a low profile container that can be used to package either or both of two different recorded media, such as a CD and a floppy disc. The container can be advantageously used to provide adequate protection to the recorded media contained therein during handling or shipping. The container has separable container top and bottom which may be made of metal or plastic. In the preferred embodiments, the container bottom has a two-level dish that provides support surfaces at two different levels, one for a CD and the other for a floppy disc. Thus the CD and floppy disc can be conveniently stacked in the container. By providing independent support for the CD and the floppy, the container can be used as a "universal" container for packaging either a CD or a floppy disc, or both at the same time.

What is claimed is:

1. A container for packaging a substantially circular recorded medium and a substantially square recorded medium comprising:

a container top formed of sheet metal drawn to form a substantially planer closed end surrounded by upstanding walls, a container bottom formed of sheet metal drawn to produce a multi-level dish having a depth greater in size than a combined height of the circular and square recorded media so as to be capable of accommodating the circular and square recorded media therein, the multi-level dish having integrally formed first and second support surfaces disposed respectively for supporting the circular recorded medium at a first level and for supporting the square recorded medium at a second level vertically spaced above the first level, the first support surface including a circular floor surrounded by a sidewall and forming a circular depression capable of accommodating a circular recorded medium at the first level, the floor being formed by drawing in such a way as to provide a radius connecting the sidewall and the floor, the radius being so positioned and sized as to support the edge of a circular recorded medium when seated in the circular depression, the first support surface also including a standoff post formed at the center of the circular floor, the second support surface including four right angle notches formed on the sidewall above the circular floor for receiving four corners of the square recorded medium when positioned thereupon, the second support surface also including the top of the standoff post being positioned in the plane of the notches so as to support the center of the square recorded medium when positioned in the notches, and the container bottom having four drawn peripheral walls of a size capable of snuggly fitting into the upstanding walls of the container top, the respective walls of the top and bottom being dimensioned such that the planer inside surface of the top, when the container is closed, is positioned in restraining location with respect to the second level to restrain a square recorded medium, when positioned in the dish, in the second level, which in turn restrains a circular recorded medium when positioned in the dish, in the first level.

2. A container as in claim 1, wherein the circular recorded medium is an optical disc and the square recorded medium is a floppy disc.

3. A container as in claim 2, wherein the multilevel dish includes a short post integrally formed at a center of the circular floor for fitting with a center hole of the optical disc.

4. A container as in claim 3, wherein the short post is formed on a standoff which has a support surface for supporting the optical disc at a clearance from the circular floor of the multi-level dish, the standoff comprising part of the first support surface.

5. A container as in claim 4, wherein the short post has a top surface disposed to support a center portion of the floppy disc at the second level, said top surface forming part of the second support surface.

* * * * *